United States Patent
Lee et al.

(10) Patent No.: US 7,424,597 B2
(45) Date of Patent: Sep. 9, 2008

(54) VARIABLE REORDERING (MUX) INSTRUCTIONS FOR PARALLEL TABLE LOOKUPS FROM REGISTERS

(75) Inventors: Ruby B. Lee, Princeton, NJ (US); Dale Morris, Steamboaat Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 391 days.

(21) Appl. No.: 10/403,785

(22) Filed: Mar. 31, 2003
(Under 37 CFR 1.47)

(65) Prior Publication Data

US 2004/0193850 A1    Sep. 30, 2004

(51) Int. Cl.
*G06F 9/312* (2006.01)
*G06F 9/315* (2006.01)

(52) U.S. Cl. .................. 712/210; 712/227; 712/228

(58) Field of Classification Search ............ 712/300, 712/225, 227, 210, 228
See application file for complete search history.

(56) References Cited

U.S. PATENT DOCUMENTS

| | | | | | |
|---|---|---|---|---|---|
| 4,713,748 | A | * | 12/1987 | Magar et al. ............ | 712/225 |
| 5,524,256 | A | * | 6/1996 | Turkowski ............... | 712/300 |
| 5,568,630 | A | * | 10/1996 | Killian et al. ............ | 712/200 |
| 5,819,117 | A | * | 10/1998 | Hansen .................... | 712/300 |
| 6,320,964 | B1 | * | 11/2001 | Callum .................... | 380/29 |
| 6,546,480 | B1 | * | 4/2003 | Mandavilli et al. ...... | 712/222 |
| 6,922,472 | B2 | * | 7/2005 | Lee et al. ................. | 380/37 |
| 6,952,478 | B2 | * | 10/2005 | Lee et al. ................. | 380/37 |
| 2002/0031220 | A1 | * | 3/2002 | Lee et al. ................. | 380/37 |
| 2002/0078011 | A1 | * | 6/2002 | Lee et al. ................. | 707/1 |
| 2002/0108030 | A1 | * | 8/2002 | Lee et al. ................. | 712/300 |
| 2005/0149590 | A1 | * | 7/2005 | Lee et al. ................. | 708/200 |

* cited by examiner

*Primary Examiner*—Daniel Pan (57) ABSTRACT

Parallel table lookups are implemented using variable Mux instructions to reorder data. Table data can be represented in a "table" register, while the desired ordering can be represented in an "Index" register. A direct variable Mux instruction can specify the table register and the index register as arguments, along with a result register. The instruction writes at least some of the data from the table register into the result register as specified in the index register. If the entire table cannot fit within a single register, entries can be divided between two or more table registers. An indirect variable Mux instruction can specify both a table-register-select register and a subword-location-select register. Both the direct and indirect Mux instructions can be used with entry data that is divided in accordance with significance between registers. In that case, plural Mux instructions are used with UnPack instructions that concatenate portions of the table entries.

15 Claims, 5 Drawing Sheets

VARIABLE REORDERING (MUX) INSTRUCTIONS FOR PARALLEL TABLE LOOKUPS FROM REGISTERS

BACKGROUND OF THE INVENTION

The present invention relates to computers and, more particularly, to computer instruction sets. A major objective of the invention is to improve computer performance when performing large numbers of table lookups.

Digital video, encryption, and code conversion are three applications in which functions of the form y=f(x) are applied repeatedly to a large number of input values. Generally, the functions applied can be expressed as mathematic expressions, but it is often more convenient to implement some functions in the form of lookup tables, with the independent variable (e.g., x) corresponding to the address and the dependent variable (e.g., y) corresponding to the contents at that address.

Lookup tables are conventionally held in main memory. A table is typically organized in memory as an array of elements, where each element holds the value of one table entry. Instructions then simply specify the desired memory locations, the contents of which are read out to provide the desired function results. While such lookups can be implemented at very high speeds, they can still limit performance in applications, such as video processing, encryption, and code conversion where very large numbers of such lookups are required. What is needed is a way to further improve performance when repeated table lookups are required.

SUMMARY OF THE INVENTION

The present invention provides variable re-ordering "Mux" instructions for computer programs and data processor instruction sets. Specifically, the present invention provides for reordering the contents of a set of one or more "table" registers as a function of the contents of a set of one or more "index" registers. The resulting reordered data can be placed in a set of one or more "result" registers. Note, the registers qualified herein as "table", "index", and "result" are all generic registers, the labels are dependent on the context provided by the Mux instructions.

The novel Mux instructions are "variable" in that the reordering can be arbitrarily specified by placing data representing the desired ordering into the set of index registers. Accordingly, the variable Mux instruction specifies a set of index registers. This specification can be "explicit" where the identity of an index register is specified as an instruction argument—i.e., is set forth in data entered in an instruction field. Alternatively, the specification of an index register can be "implicit", e.g., the identity of a dedicated index register can be inherent in the instruction. Likewise, the result and table registers can be specified implicitly or explicitly by a variable Mux instruction.

A variable Mux instruction is considered "direct" if it specifies (implicitly or explicitly) a set of table registers. In an "indirect" variable Mux instruction, table registers are not identified directly, but indirectly by one or more index registers that are directly specified by the Mux instruction. For example, an indirect variable Mux instruction can specify two index registers, a table-select index register that selects a table register for each requested entry, and a subword-select index register that selects the subword position within the selected table register for each requested entry. Alternatively, using a single index register, higher-significance of an index register subword can select a table register, while the lower-significance bits of the subword select the desired subword of the selected table register.

Where an entire table can be represented in a single table register, the location of each table entry can be identified as a subword address within that register. A "direct" variable Mux instruction can specify the single table register, as well as single result and index registers. When the Mux instruction is executed, the contents of the table register are selectively written into the result register in the subword order specified by the index register.

A lookup table too large to be represented in a single register may be divided among two or more table registers. The division can be vertical, horizontal, or both. Where the division is exclusively vertical, entries are left intact; some are represented in one register, while others are represented in one or more other registers. Where the division is exclusively horizontal, each entry is divided (typically by significance) among two or more registers, each of which represents a part of every entry. Where vertical and horizontal divisions are both employed, no register represents all entries and no register represents any one entire entry. For example, a table can be divided among four registers, each of which represents half of each of half of the table entries.

In a vertical-only division, each table register holds some but not all table entries. For example, if there are eight table entries divided between two table registers, one table register can hold the entries for the four lowest addresses while the other can hold the entries for the four highest addresses. Each table entry is then held at a specific subword location with a specific register. To allow full flexibility in reordering entries for vertically divided tables, the invention provides for using indirect variable mux instructions with vertically divided tables.

In a horizontally-only divided table, each table entry is divided among two or more table registers, but all entries are represented in each table register. In such a case, a direct variable Mux instruction can be applied to each table register, using the same index register so that a common ordering would be applied to each segment of each entry. Typically, there is a separate result register for each table register, with each result register holding a segment of each desired entry. Additional instructions, e.g., "UnPack" instructions can be used to concatenate entry segments, so that each entry is found in complete form in a register.

A table divided both horizontally and vertically can be conceptualized as forming a two-dimensional array with each cell representing entry segments for a subset of the table addresses. In such a case, the invention provides for applying indirect variable Mux instructions on a column-by-column basis so that the desired ordering is achieved for each entry segment. Optionally, Unpack or other concatenating instructions can be used to assemble complete entries within registers.

"Mux" instructions are sometimes referred to as "permute" instructions, as they do permit permutation of data; however, the Mux instructions allow other forms of reordering not normally considered permutations. For example, not all subwords of the table register need to be represented in the result registers, and one or more subwords of the table register can be represented more than once in the result register.

The present invention leverages a trend in computer architectures toward wider and more parallel data processors. In consonance with this trend, it is easier (e.g., simpler and more economical) to add additional computational functional units than it is to add memory units. Where tables are placed in memory, throughput is constrained by the number of memory ports; where lookup tables are placed in registers, throughput is constrained by the number of parallel computational units. As the number of computational units outstrips the number of memory ports, the novel approach of using variable Mux instructions on tables held in registers becomes increasingly advantageous over the prior art.

The variable Mux instructions described herein are variable variants of fixed Mux instructions used in the prior art. The fixed Mux instructions are much more limited in their usefulness for table lookups, since the order in which subwords are represented in the results register cannot be specified by computed values. The variable Mux instructions of the invention do allow arbitrary ordering of subwords and thus allow multiple table entries to be accessed in parallel using a single Mux instruction (with additional assembly of results required for large tables). However, computer architectures that employ fixed Mux instructions already have data paths in place that can be used by the variable Mux instructions; thus adding the novel instructions involves less hardware modification that would some instruction without a precursor. The invention provides for a dramatic increase in performance relative to the prior art since multiple table lookups can be performed per instruction. Other features and advantages of the invention are apparent from the detailed description below with reference to the following drawings.

DETAILED DESCRIPTION

Figure 1:
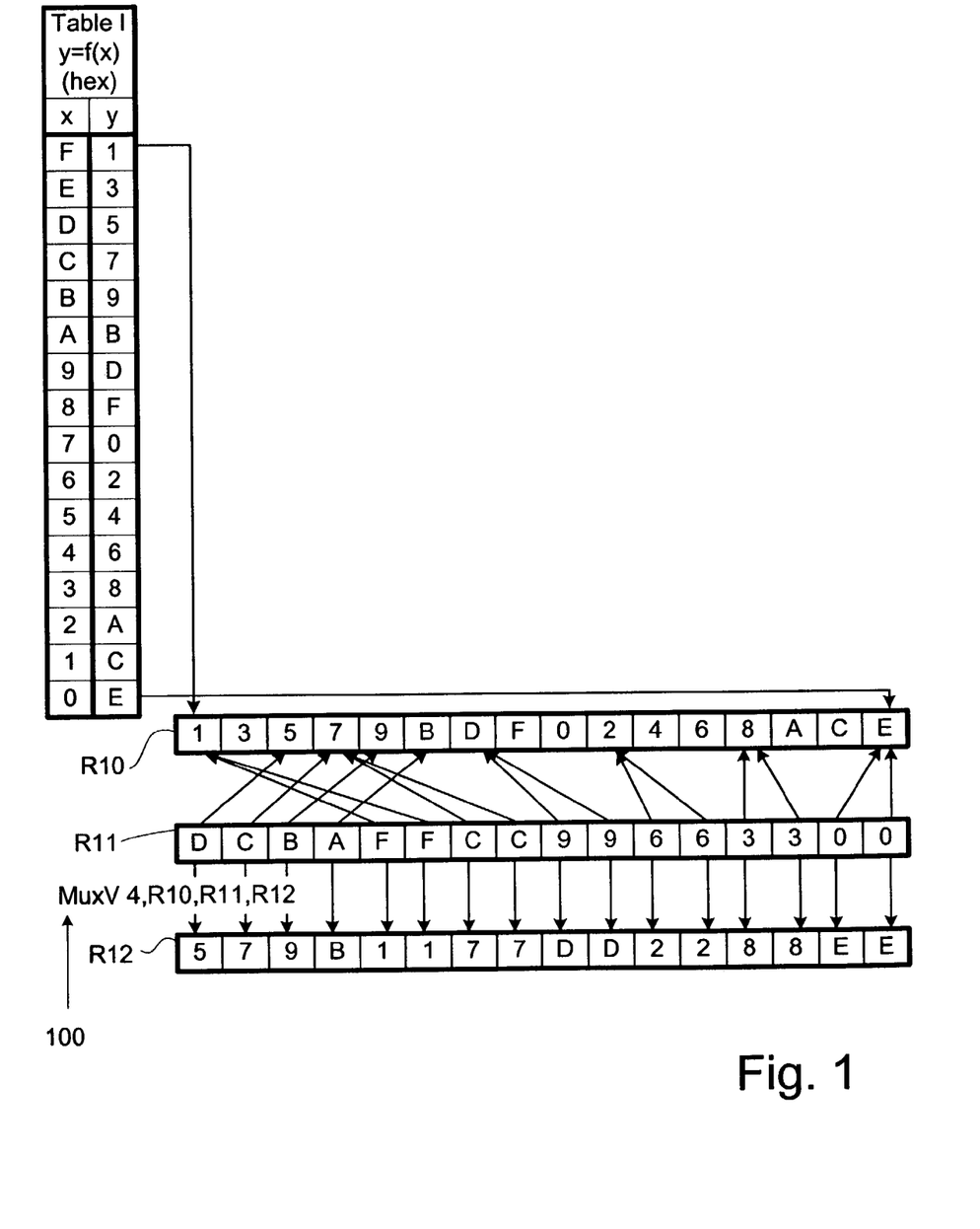
FIG. 1 is a schematic diagram of a segment of a program in accordance with the invention that performs a parallel table lookup using a single variable mux instruction.

A one-instruction segment of a program 100, shown in FIG. 1, evaluates a function y=f(x) for sixteen values of x held together in an 64-bit "index" register R11. The function y=f(x) is evaluated by accessing a look-up Table I, which has sixteen 4-bit entries (y) at respective 4-bit addresses (x). The entries of Table I are arranged in a 64-bit "table" register R10 in little endian order, i.e., with the entry at the lowest address located at the least-significant nibble (four bits) of register R10.

The function is evaluated using a variable multiplexing instruction, MuxV 4,R10,R11,R12. As indicated by the arrows from index register R11 to table register R10, each nibble location (4-bit subword location) of index register R11 holds a table address, and thus points to a nibble location of table register R10 that holds the entry for that address. As indicated by the arrows from index register R11 to 64-bit result register R12, each nibble location of register R11 corresponds to a respective nibble location of result register R12. Accordingly, the instruction MuxV 4,R10,R11,R12 can be parsed as follows: for each "index" nibble held in index register R11, write the indicated table entry (in register R10) into the corresponding nibble location of result register R12.

In FIG. 1, a parallel table lookup is achieved with one instruction because the entire table can be represented in a single register. Where a table does not fit into a single register, the invention provides for dividing the table among two or more registers.

Figure 2:
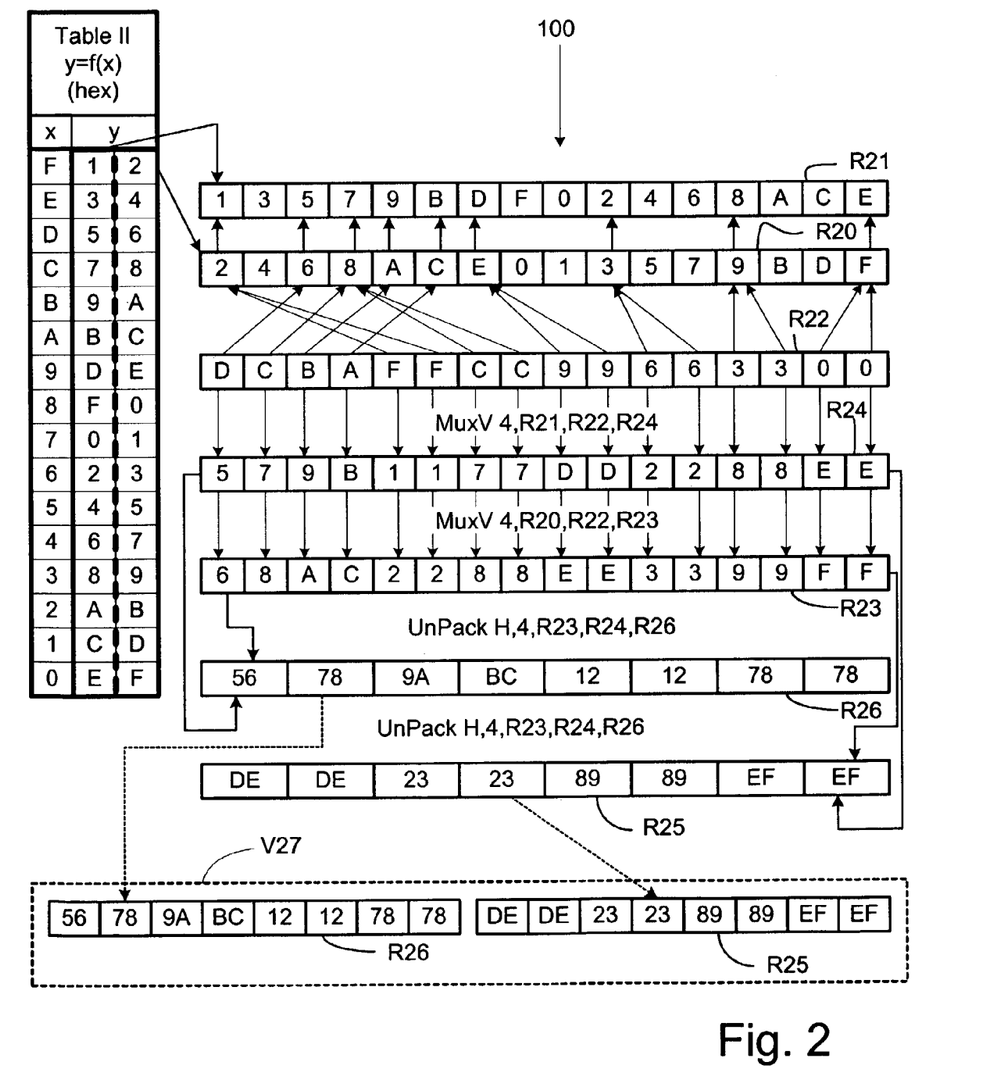
FIG. 2 is a schematic diagram of a segment of the program of FIG. 1 that performs a parallel table lookup on a horizontally-divided table using plural variable Mux instructions plus UnPack instructions that concatenate results across result registers.

In FIG. 2, a Table II is divided horizontally to provide for a parallel lookup. Table II includes sixteen 8-bit entries, for a total of 128 bits. Two 64-bit registers R20 and R21 are required to hold the contents of Table II. Each entry includes a most-significant nibble (e.g., E [hex] for the entry at table address 0 [hex]), and a least-significant nibble (e.g., F for the entry at table address 0). All the least-significant nibbles of the Table II entries are written into table register R20, while all the most-significant nibbles of the Table II entries are written into table register R21. The division is horizontal in that the table columns are divided into two 4-bit-wide column groups, as indicated by the dashed line in Table II.

The values of x for which the function y=f(x) is to be evaluated are represented in index register R22. (The contents of which are identical to index-register R11 in FIG. 1.) Each nibble of index register R22 points to a corresponding nibble of table register R20, as well as to a corresponding nibble of table register R21, as by the generally upward arrows to those registers in FIG. 2. Each nibble location of index register R20 has a corresponding nibble position in result register R23 and also in result register R24, as indicated by the vertically downward arrows to registers R23 and R24 in FIG. 2.

The segment of program 100 represented in FIG. 2 uses two variable Mux instructions. MuxV 4,R20,R22,R23 writes entries of table register R20 in result register R23 as directed by the contents of index-register R22. Likewise, MuxV 4,R21,R22,R23 writes entries of table register R21 into result register R24 as directed by the contents of index register R22. Note that while the two instructions refer to different table and result registers, they share the same index register R22. As a result, the order of the least-significant entry nibbles in result register R23 corresponds to the order of the most-significant entry nibbles in result register R24.

UnPack instructions can then be used to "reassemble" the entries. UnPack L,4 R23,R24,R25, writes the least-significant nibble of register R23 into the least-significant nibble location of register R25, and writes the least-significant nibble of register R24 into the second least-significant nibble position of register R25. The result is that the full eight bits of the entry requested by the least-significant nibble of index register R22 is written into the least-significant byte (8-bit) location of register R25. Likewise, the seven next least-significant table lookups are represented in the seven other byte positions of register R25. Similarly, UnPack H,4 R23,R24, R26, concatenates the four most-significant nibbles of each of registers R23 and R24 into bytes and places them byte-wise in register R26. Collectively, registers R25 and R26 can be considered as representing single 128-bit value V27 consisting of table entry bytes in the order specified by index register R22.

Four instructions are required for the desired result in FIG. 2. In an application-specific embodiment, a single variable Mux instruction, MuxVh 4,8, R20,R21,R22,R25,R26, can be used to achieved the desired result directly. However, this approach involves additional hardware complexity, as it involves three-register reads and a two-register writes. Also, note that two bit-length parameters are required because the index length (4-bits) differs from the entry length (8-bits).

Of course, if the entries were not divided, they would not have to be reassembled and the UnPack instructions would not be required. Table III of FIG. 3 (representing the same data as Table II of FIG. 2) is vertically divided instead of horizontally divided. Thus, one table register R30 holds the 8-bit entries for the eight least-significant addresses of Table III, while another register R31 holds the entries for the eight most-significant addresses of Table III.

Figure 3:
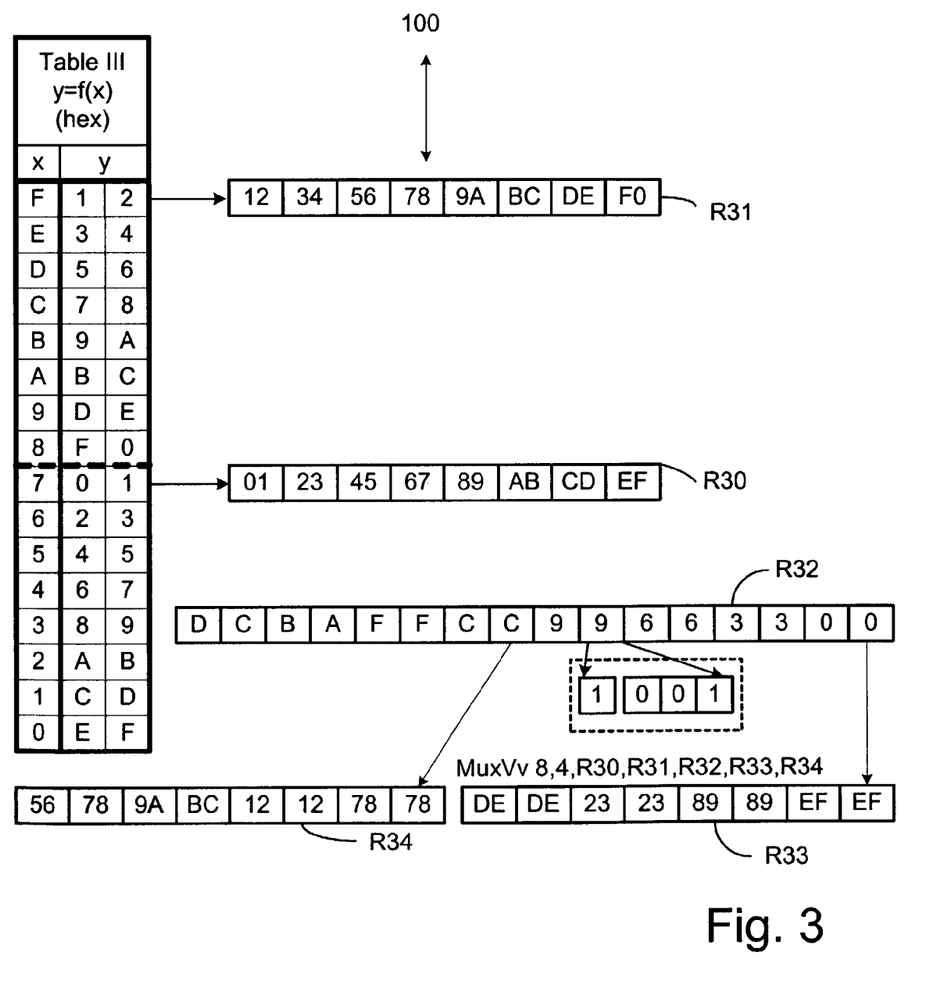
FIG. 3 is a schematic diagram of a segment of the program of FIG. 1 that performs a parallel table lookup on a vertically-divided table using a variable Mux instruction.

The values of x for which function f(x) is to be evaluated are represented in index register R32. Each value of x is four bits, as indicated for one of the "9s" in index register R32. Note that the most-significant bit (a "1" in this case) of an index determines which table register a desired entry is in (table register R31 in this case), while the three least-significant bits ("001" in this case) of an index indicates a subword position (the second-least-significant subword position in this case) within the selected register.

The segment of program 100 represented in FIG. 3 uses a variable Mux instruction MuxVv 8,4,R30,R31,R32,R33,R34 to write entries in the desired order into result registers R33 and R34. Note that the instruction requires three read ports and two write ports, thus making it best suited for application specific situations. Note that it is possible to perform a mux operation on each table register independently and then recombine the resulting data. However, the program sequence is more complex than it is for the horizontally-divided table approach.

In general, since the register-select bits of an index and the subword-select bits of an index are performing different functions, it can be useful to write them into separate registers. In particular, it can be advantageous to write the register-select bits into a special-purpose register: since most-processor designs do not permit an instruction to select one general-purpose register as a function of the contents of another general-purpose register.

Figure 4:
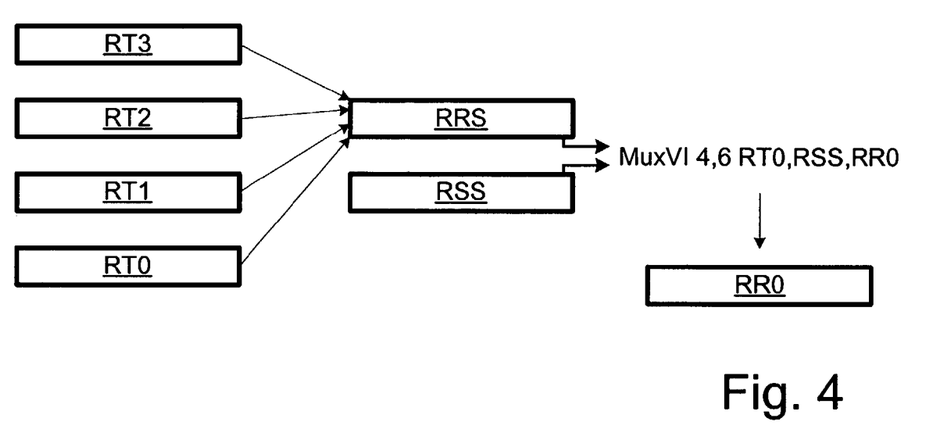
FIG. 4 is a schematic diagram of a segment of the program of FIG. 1 that performs a parallel table lookup on a vertically-divided table using an indirect variable Mux instruction.

FIG. 4 shows the registers involved in a 64×4-bit entry table represented in contiguous 64-bit table registers RT0, RT1, RT2, and RT3. There are two index registers: register-select register RRS and subword-select register RSS. Collectively, they hold horizontally-divided values of x for the function y=f(x) to be evaluated. The results are written into contiguous result registers RR0, RR1, RR2, and RR3. The indirect variable Mux instruction MuxVI 4,6 RT0,RSS,RR0 performs the desired parallel table lookup.

Mux instruction MuxVI 4,6 RT0,RSS,RR0 specifies the seven registers shown in FIG. 4, but only three of these are specified explicitly: a first table register RT0, a subword-select register RSS, and a result register. The instruction requires four contiguous registers, so identifying the first (RT0) explicitly, determines the identities of the remaining three—so they are specified implicitly. The instruction requires that register-select data be stored in a special-purpose register RRS, so it is specified implicitly. As the instruction calls for 16 parallel lookups of 4-bit subwords, all results can be stored in the explicitly specified result register RR0.

While the MuxVI instruction does specify one table register (RT0) explicitly and the others (RT1, RT2, RT3) implicitly, it does not specify which table register is to be used for which result-register subwords. Instead, the mapping of table registers to result-register subwords is specified indirectly by the contents of register-select register RRS. MuxVI is indirect in that the mapping of table registers to result-register subwords is determined indirectly by a register, rather than directly by the instruction contents.

Register-select register RRS is a special-purpose register designed so that its contents can control the selection of other registers. Register-select register RRS holds four-bits per x to be used in evaluating y=f(x). Only two are required to select among the four table registers, and the other two hold default zeroes. The table data is forced to one of four possibilities, registers 0-3, registers 32-35, registers 64-67, and registers 96-99.

The indirect variable Mux instruction provides the desired reordering in one instruction. Also, as the register-select bits and subword-select bits are written into different registers, there is room in the registers for more indices and thus greater parallelism. On the other hand, there are six operand registers instead of the more typical two operand registers. Scaling beyond tables that can fit within four registers can involve considerable hardware complexity.

Some embodiments of the invention employ microprocessors in which some or all of the registers are 2048 bits or greater to allow single-instruction lookups in 256×8-bit tables. Such tables are useful for video, which often involves 8-bit-per-pixel data, encryption (e.g., DES S-box lookups), and code translation (e.g., translating ASCII to another text format). In other embodiments, provisions are made for ganging registers so that they collectively function as 2048-bit registers. Others take advantage of the horizontal and vertical table division techniques disclosed above to handle such large tables.

In view of the binary nature of computers, it is often convenient to deal with data expressed in a number of bits that is a power of two. Leading zeroes can be added to non-conforming data so that this constraint is met. For example, leading zeros can be added to 7-bit entries so that they align with byte-boundaries in registers. Likewise, two leading zeros can be added to 6-bit indices so that they conform to register byte boundaries. Alternatively, non-conforming data can be "packed" together to maximize the amount of data that can be fit in a register. For example, twenty-one lookups with 3-bit indices can be handled by a 64-bit register, while only 16 4-bit indices can be handled by a 64-bit register. As an alternative to packing data contiguously and to filling out to the nearest power of two, unused register bits can be distributed uniformly among the indices.

Figure 5:
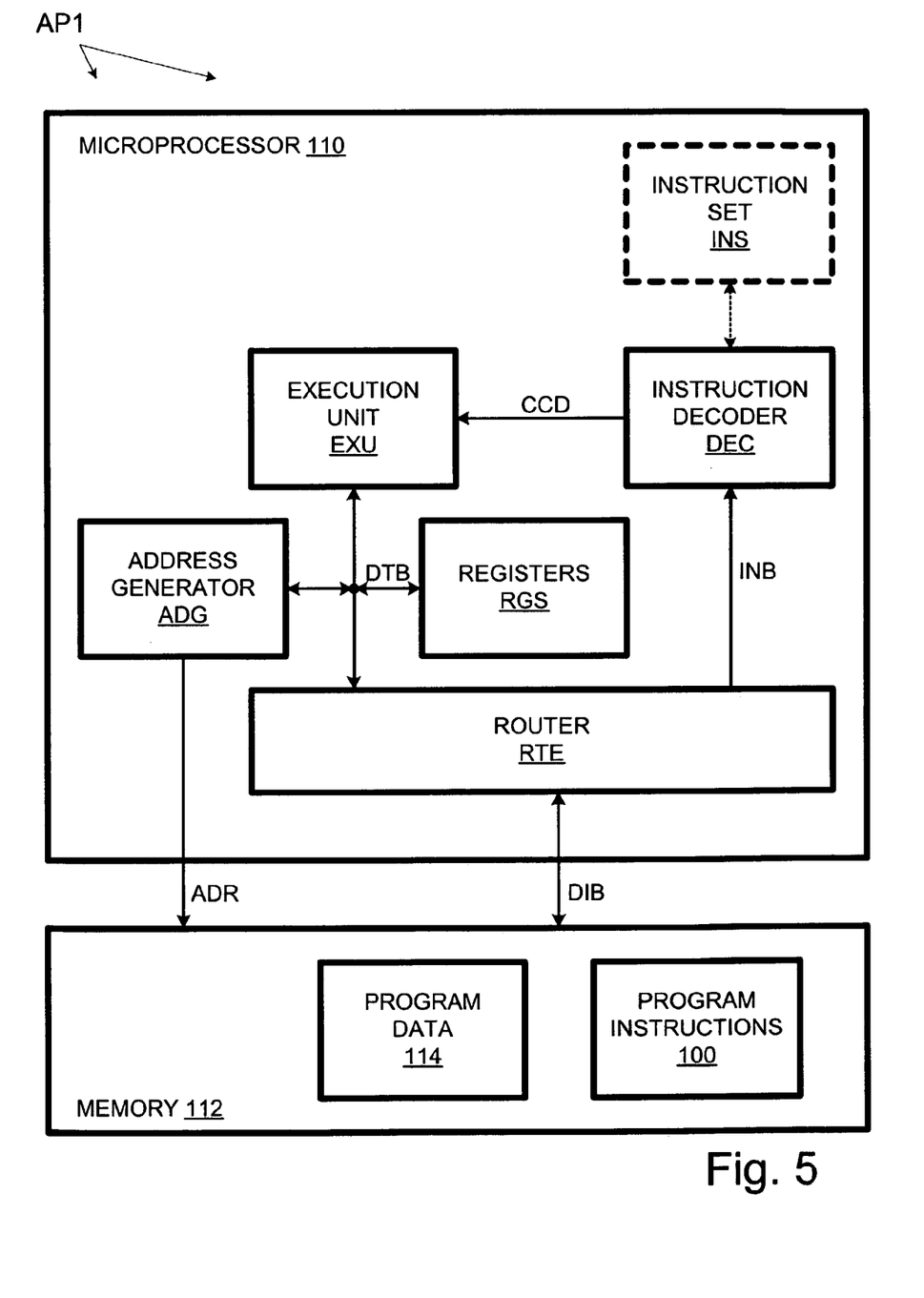
FIG. 5 is a schematic of a microprocessor system of the invention for executing the program of FIG. 1.

Program 100 is implemented on a computer system, such as system AP1, shown in FIG. 5. Computer system AP1 includes a microprocessor 110 and memory 112. The contents of memory 112 include program data 114 and instructions constituting a program 100. Microprocessor 110 includes an execution unit EXU, an instruction decoder DEC, registers RGS, an address generator ADG, and a router RTE. Register bank RGS include all registers referenced and illustrated herein.

Generally, execution unit EXU performs operations on data 114 in accordance with program 100. To this end, execution unit EXU can command (using control lines ancillary to internal data bus DTB) address generator ADG to generate the address of the next instruction or data required along address bus ADR. Memory 112 responds by supplying the contents held at the requested address along data and instruction bus DIB.

As determined by indicators received from execution unit EXU along indicator lines ancillary to internal data bus DTB, router RTE routes instructions to instruction decoder DEC via instruction bus INB and data along internal data bus DTB. The decoded instructions are provided to execution unit EXU via control lines CCD. Data is typically transferred in and out of registers RGS according to the instructions.

Associated with microprocessor 110 is an instruction set of instructions INS that can be decoded by instruction decoder DEC and executed by execution unit EXU. Program 100 is an ordered set of instructions selected from instruction set INS. For expository purposes, microprocessor 110, its instruction set INS and program 100 provide examples of all the instructions described herein.

The invention provides for registers of any size, including non-power-of-two sizes. A table can have any number of entries and the entries can be any number of bits long. As indicated above, if the parallel indices do not fill the parallel index register(s), the unused bits can be distributed in various ways and perhaps used for various applications. The invention provides for many implementations of indirect parallel lookup. These and other variations upon and modifications to the present invention are provided for by the present invention, the scope of which is defined by the following claims.

What is claimed is:

1. A data processor comprising:
   first, second, third, fourth, fifth, and sixth registers; and
   an execution unit for executing a first variable mux instruction that specifies a subword size and said first register as arguments, said execution unit writing at least some of the contents of said second register into said third register in an order that is a function of the contents of indices stored in said first register, said execution unit further executing a second variable mux instruction that specifies said fourth register as an argument, said execution unit, while executing said second variable mux instruction, writing at least some of the contents of said fifth register into said sixth register in an order that is a function of the contents of said fourth register, said execution unit concatenating the contents of said third and sixth registers on a subword-by-subword basis in response to at least one other instruction.

2. Computer-readable storage media comprising:
   a first variable mux instruction that specifies a subword size and a first register as arguments, said first variable mux instruction storing at least some of the contents of a second register in a third register in an order that is a function of the contents of indices stored in said first register;
   a second variable mux instruction that specifies a fourth register as an argument, said second variable mux instruction, when executed, storing at least some of the contents of a fifth register in a sixth register in an order that is a function of the contents of said fourth register; and
   at least one other instruction that concatenates the contents of said third and sixth registers on a subword-by-subword basis.

3. A data processor comprising:
   three or more registers; and
   an execution unit for executing a variable mux instruction so as to store in plural result locations of a result set of said registers contents of content locations of a content set of said registers as function of multi-bit indices stored in respective index locations of an index set of said registers so that each of said result locations stores the contents of a content location specified by a multi-bit index stored in an index location corresponding to that result location, said instruction specifying as an argument a subword size for said plural result locations, wherein for any combination of content location and index location there exists an index that specifies said content location.

4. A data processor as recited in claim 3 wherein said variable mux instruction specifies as an argument at least one of said sets directly.

5. A data processor as recited in claim 3 wherein said variable mux instruction specifies as an argument a pointer set of said registers, at least one of said result, content, and index sets being specified by pointers stored in said pointer set.

6. A data processor as recited in claim 3 wherein said variable mux instruction specifies a common subword size for said content locations and said result locations.

7. A computer-implemented method comprising:
   storing subword-sized contents in respective content locations of a content set of registers and storing indices in respective index locations of an index set of registers; and
   executing a variable mux instruction so as to store in subword-sized result locations of a result set of said registers said contents so that each of said result locations stores the contents of a content location specified by multi-bit index stored at an index location corresponding to that result location, said instruction specifying as an argument a subword size for said result locations, wherein for any combination of content location and index location there exists an index that specifies said content location.

8. A computer-implemented method as recited in claim 7 wherein said variable mux instruction specifies as an argument at least one of said sets directly.

9. A computer-implemented method as recited in claim 7 wherein said variable mux instruction specifies as an argument a pointer set of said registers, at least one of said result, content, and index sets being specified by pointers stored in said pointer set.

10. A computer-implemented method as recited in claim 7 wherein said variable mux instruction specifies a common subword size for said content locations and said result locations.

11. Computer-readable storage media comprising a computer-executable variable mux instruction that calls for storing in subword-sized result locations of a result set of registers the contents of subword-sized content locations of a content set of registers as a function of indices stored in index locations of an index set of registers so that each of said result locations stores the contents of a content location specified by a multi-bit index stored in an index location corresponding to that result location, said instruction specifying as an argument a subword size for said result locations, wherein for any combination of content location and index location there exists an index that specifies said content location.

12. Computer-readable storage media as recited in claim 11 wherein said variable mux instruction specifies as an argument at least one of said sets directly.

13. Computer-readable storage media as recited in claim 11 wherein said variable mux instruction specifies as an argument a pointer set of set of registers, at least one of said result, content, and index sets being specified by pointers stored in said pointer set.

14. Computer-readable storage media as recited in claim 11 wherein said variable mux instruction specifies a common subword size for said content locations and said result locations.

15. A data processor comprising:
   first, second and third registers; and
   an execution unit for executing first and second variable mux instructions, said execution unit when executing said first variable mux instruction writing at least some of the contents of said second register into said third register in an order that is a function of indices stored in said first register, said execution unit when executing said second variable mux instruction writing at least some of the contents of said third register into said first register in an order that is a function of the contents of said second register.

* * * * *

UNITED STATES PATENT AND TRADEMARK OFFICE
CERTIFICATE OF CORRECTION

| | | |
|---|---|---|
| PATENT NO. | : 7,424,597 B2 | Page 1 of 1 |
| APPLICATION NO. | : 10/403785 | |
| DATED | : September 9, 2008 | |
| INVENTOR(S) | : Ruby B. Lee et al. | |

It is certified that error appears in the above-identified patent and that said Letters Patent is hereby corrected as shown below:

On the Title page, Item (75), in "Inventors", line 2, delete "Steamboaat" and insert -- Steamboat --, therefor.

In column 8, line 43, in Claim 13, delete "set of set of" and insert -- set of said --, therefor.

Signed and Sealed this

Sixth Day of January, 2009

JON W. DUDAS
*Director of the United States Patent and Trademark Office*